United States Patent
Numata

(10) Patent No.: US 9,008,477 B2
(45) Date of Patent: Apr. 14, 2015

(54) ALIGNMENT OF SINGLE-MODE POLYMER WAVEGUIDE (PWG) ARRAY AND SILICON WAVEGUIDE (SIWG) ARRAY FOR PROVIDING ADIABATIC COUPLING

(71) Applicant: International Business Machines Corporation, Armonk, NY (US)

(72) Inventor: Hidetoshi Numata, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/047,085

(22) Filed: Oct. 7, 2013

(65) Prior Publication Data

US 2014/0112616 A1    Apr. 24, 2014

(30) Foreign Application Priority Data

Oct. 18, 2012    (JP) .................................. 2012-231090

(51) Int. Cl.
| | | |
|---|---|---|
| *G02B 6/26* | (2006.01) | |
| *G02B 6/42* | (2006.01) | |
| *G02B 6/122* | (2006.01) | |
| *G02B 6/132* | (2006.01) | |
| *G02B 6/13* | (2006.01) | |
| *G02B 6/24* | (2006.01) | |

(52) U.S. Cl.
CPC ................. *G02B 6/122* (2013.01); *G02B 6/132* (2013.01); *G02B 6/13* (2013.01); *G02B 6/24* (2013.01)

(58) Field of Classification Search
CPC ........... G02B 6/13; G02B 6/132; G02B 6/136

USPC .................................................. 385/39, 43, 50
See application file for complete search history.

(56) References Cited

U.S. PATENT DOCUMENTS

| 8,534,927 | B1 * | 9/2013 | Barwicz et al. .................. 385/60 |
| 8,724,937 | B2 * | 5/2014 | Barwicz et al. .................. 385/14 |

FOREIGN PATENT DOCUMENTS

| JP | H06-109936 A | 4/1994 |
| JP | H07-045811 A | 2/1995 |
| JP | H11-258455 A | 9/1999 |
| JP | 2000-075158 A | 3/2000 |
| JP | 2004-102220 A | 4/2004 |
| JP | 2005-208187 A | 8/2005 |
| JP | 2006-139147 A | 6/2006 |
| JP | 2007-212786 A | 8/2007 |
| JP | 2008-058530 A | 3/2008 |
| JP | 2008-089879 A | 4/2008 |
| JP | 2009-031780 A | 2/2009 |

* cited by examiner

*Primary Examiner* — Ryan Lepisto
(74) *Attorney, Agent, or Firm* — Vazken Alexanian

(57) ABSTRACT

Alignment of a single-mode polymer waveguide (PWG) array fabricated on a polymer with a silicon waveguide (SiWG) array fabricated on a silicon (Si) chip and thereby realizing an adiabatic coupling. A stub and a groove are fabricated with high precision and made to function as the absolute positioning reference to provide a self-alignment according to the groove and the stub. In a PWG patterning by photolithography, plural masks are used, but the fabrication is made along the alignment base line for mask and thus a high precision is achieved with respect to error δx. In a PWG patterning by nano imprint, a high precision in the fabrication is also achieved with respect to error δx and δy.

12 Claims, 8 Drawing Sheets

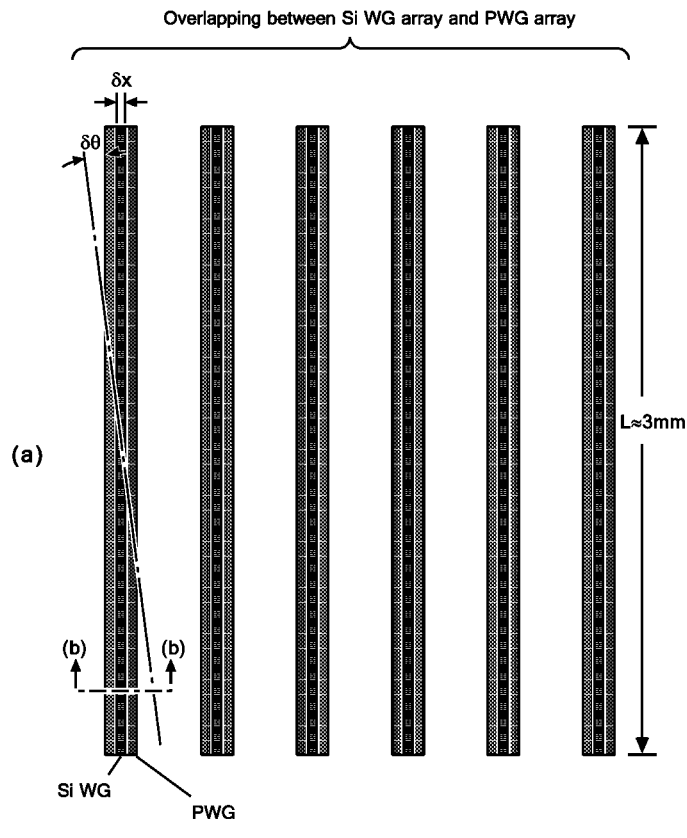
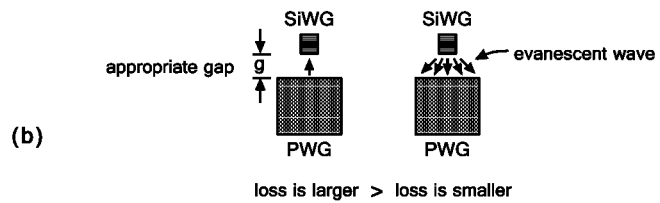
FIG. 2

(a) PWG patterning by nano-imprint

Patterning a complicated structure in vertical direction at sub-micro meter precision is possible. Because it can avoid the mechanical distortion caused by a heat or a pressure, in either of horizontal direction(X) or vertical direction(Y)

1. Coat a polymer on a glass substrate

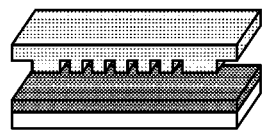

2. Put a metal cast on a polymer

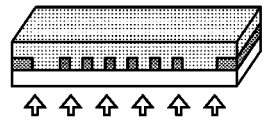

⇧ ⇧ ⇧ ⇧ ⇧ ⇧
UV exposure

3. Exposure UV light

4. Remove a cast from a polymer (b) PWG patterning by photolithography

Patterning at sub-micro meter precision is possible, but it is impossible to fabricate a complicated structure in vertical direction

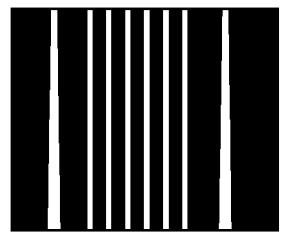

1. Make a glass photo-mask

UV exposure
⇩ ⇩ ⇩ ⇩ ⇩ ⇩  core

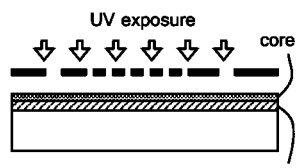

2. Exposure UV light  (under) clad

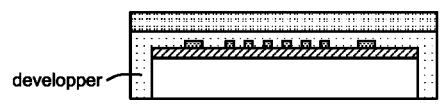

developper

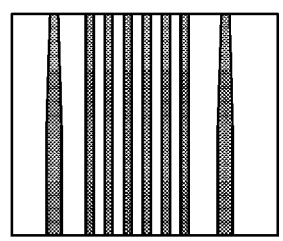

3. Development

FIG. 7

ALIGNMENT OF SINGLE-MODE POLYMER WAVEGUIDE (PWG) ARRAY AND SILICON WAVEGUIDE (SIWG) ARRAY FOR PROVIDING ADIABATIC COUPLING

CROSS-REFERENCE TO RELATED APPLICATION

This application claims priority under 35 U.S.C. §119 from Japanese Patent Application No. 2012-231090 filed Oct. 18, 2012, the entire contents of which are incorporated herein by reference.

BACKGROUND OF THE INVENTION

The present invention relates to the provision of a coupling allowing transmission of light between a polymer waveguide (PWG) array and a silicon waveguide (SiWG) array. More specifically, the present invention relates to a technique for providing high-precision alignment of arrays in a single-mode polymer waveguide (PWG) so that an adiabatic coupling is provided.

Both multi-mode and single-mode polymer waveguides (PWG) are widely used in either a rigid form on a printed board or in a flexible form on a polymer base film.

The principle of an optical waveguide (WG) is that a combination of core and clad is provided and the core is used as a light transmitting path. The combination of core and clad is a combination of two different types of polymers having a different refractive indexes.

Silicon waveguides (SiWG), in which a light transmitting path is fabricated on a silicon (Si) chip, are also widely used.

In both the polymer waveguide (PWG) and in the silicon waveguide (SiWG), multi-channel waveguides (WG) are fabricated in array in one direction in parallel with each other so that multi-channel light transmitting paths are provided. Attempts have been made to transmit light between the polymer waveguide (PWG) and the silicon waveguide (SiWG). However, a coupling which allows light to be transmitted efficiently at the microscopic level requires high-precision positioning.

In the case of multi-mode waveguides (WG), when the waveguides are coupled to each other or when the waveguide is coupled to a multi-mode optical fiber, a large cross section of core, almost the same size of core cross section, and almost the same numerical apertures can provide such coupling with an acceptable level of loss as long as a precise positioning of the abutting cross sections is guaranteed between the cross sections coming into connection with each other. Actually, what is called a "Butt Coupling" is used to provide the above coupling.

However, when a single-mode waveguide (WG) is coupled to a silicon waveguide (SiWG), the cross section of core is very small and the connected waveguides are very different from each other in the size of core cross section and in the numerical aperture. Thus, it is very difficult to use the Butt Coupling. In this case, adiabatic coupling can be used as an alternative method by which evanescent light in an optical axis direction along the array is captured and transmitted over a predetermined distance in the optical axis direction.

However, a technique is still unknown which, when a single-mode waveguide (WG) is coupled to a silicon waveguide (SiWG), provides high-precision alignment of arrays to provide the adiabatic coupling.

Concerning innovative methods for fabricating polymer waveguides (PWG) or positioning multi-channel polymer waveguides (PWG), a variety of elemental techniques are known. However, there is no known literature which provides the adiabatic coupling or refers to high-precision alignment, such as self-alignment for providing the adiabatic coupling.

SUMMARY OF INVENTION

The present invention allows high-precision alignment of a single-mode polymer waveguide (PWG) array fabricated on a polymer and a silicon waveguide (SiWG) array fabricated on a silicon (Si) chip, so that an adiabatic coupling is realized. A single-mode polymer waveguide (PWG) array fabricated on polymer and a silicon waveguide (SiWG) array fabricated on a silicon (Si) chip are self-aligned according to a combination of a stub and a groove highly precisely fabricated on both sides.

Accordingly, one aspect of the present invention is a structure including a combination of (i) a stub fabricated on a polymer and (ii) a groove fabricated on a silicon (Si) chip, with which an adiabatic coupling can be realized by aligning (a) a single-mode polymer waveguide (PWG) array fabricated on the polymer with (b) a silicon waveguide (SiWG) array fabricated on the silicon chip, wherein the stub fabricated on the polymer is fabricated along a direction in which the PWG array is fabricated, wherein the stub fabricated on the polymer is fabricated using a second mask arranged along the same alignment base line for a first mask used in a photolithography process for fabricating the PWG array and the second mask has an exposure pattern different from the first mask, and wherein the groove fabricated on the silicon chip is fabricated along a direction in which the SiWG array is fabricated.

Another aspect of the present invention is a method of fabricating on a polymer a single-mode polymer waveguide (PWG) array and a stub so that the single-mode polymer waveguide (PWG) array and the stub are aligned with a silicon waveguide (SiWG) array fabricated on a silicon (Si) chip and a groove fabricated along a direction in which the SiWG is fabricated, whereby an adiabatic coupling is realized, the method including the steps of: coating a clad layer on the polymer; preparing a first mask along an alignment base line above a core layer and a under clad layer coated; fabricating a core array on the clad layer according to a photolithography process with the first mask, wherein the refractive index of a material of the core layer being larger than the refractive index of a material of the clad layer; coating a base layer used to fabricate the stub by use of a same type polymer material as that of the core array, so that the core array is covered by the base layer; preparing a second mask having an exposure pattern different from the first mask along the same alignment base line used in the preparation of the first mask; and fabricating the stub according to a photolithography process with the second mask.

BRIEF DESCRIPTION OF THE DRAWINGS

FIG. 2 is a top view for explaining overlapping of a silicon waveguide (SiWG) array and a polymer waveguide (PWG) array and for explaining evanescent wave involved in adiabatic coupling. More specifically as follows:

FIG. 2(a) illustrates the overlapping of a silicon waveguide (SiWG) array and a polymer waveguide (PWG) array; and FIG. 2(b) illustrates the evanescent wave involved in adiabatic coupling.

FIG. 3(a) shows overlapping in the case of a slight amount δx of misalignment;

FIG. 3(b) shows overlapping in the case of a slight amount δθ of misalignment (inclination); and FIG. 3(c) shows overlapping in the case when misalignment of δx and inclination of δθ are combined.

FIG. 6(a) shows PWG patterning by photolithography; and

FIG. 6(b) shows PWG patterning by nano-imprint.

FIG. 7 is a view for explaining respective methods of PWG patterning by photolithography and PWG patterning by nano-imprint when the polymer waveguide (PWG) array and the stub are fabricated according to an embodiment of the present invention. More specifically as follows:

FIG. 7(a) shows PWG patterning by nano-imprint; and

FIG. 7(b) shows PWG patterning by photolithography.

DETAILED DESCRIPTION OF THE PREFERRED EMBODIMENTS

The present invention allows high-precision alignment of a single-mode polymer waveguide (PWG) array fabricated on a polymer and a silicon waveguide (SiWG) array fabricated on a silicon (Si) chip so that an adiabatic coupling is realized. A single-mode polymer waveguide (PWG) array fabricated on polymer and a silicon waveguide (SiWG) array fabricated on a silicon (Si) chip are self-aligned according to a combination of a stub and a groove highly precisely fabricated on both sides.

Figure 1:
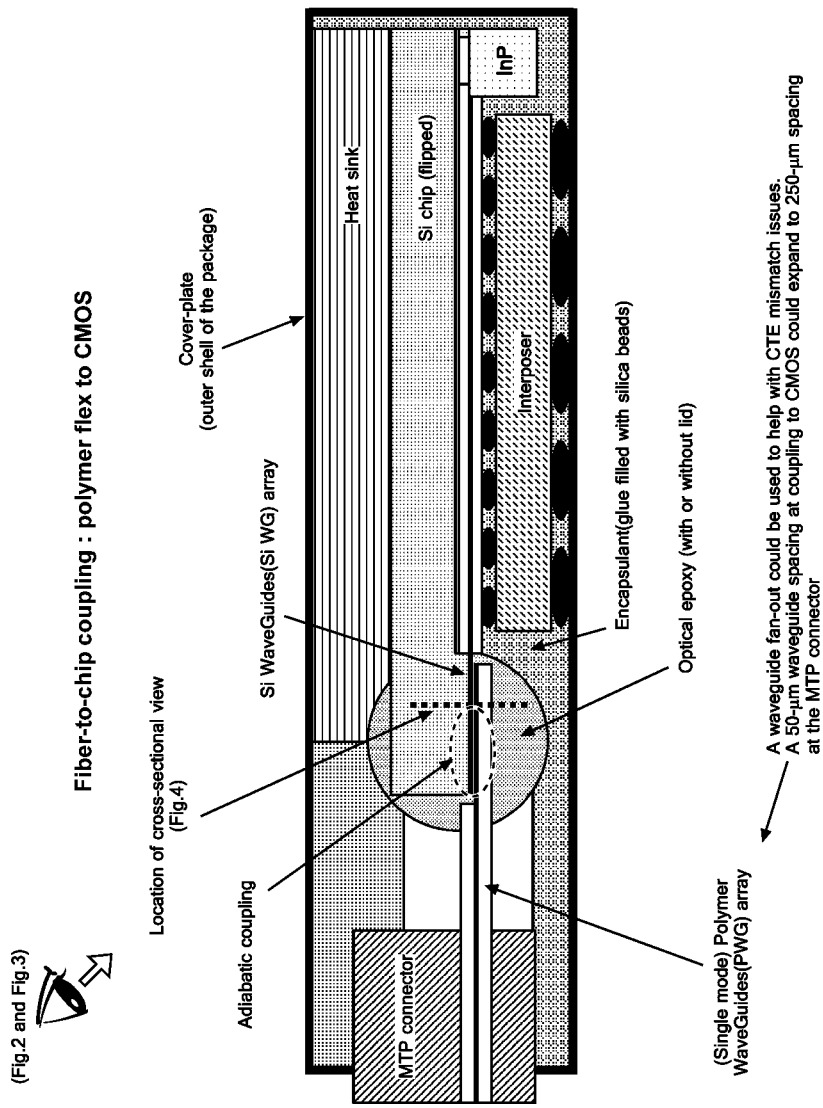
FIG. 1 is an overall view illustrating an area in which the inventive adiabatic coupling is provided and the structure of a package containing the area.

FIG. 1 is an overall view illustrating an area in which the inventive adiabatic coupling is provided and the structure of a package containing the area.

Adiabatic coupling is realized by aligning a single-mode polymer waveguide (PWG) array fabricated on a polymer with a silicon waveguide (SiWG) array fabricated on a silicon (Si) chip. The combined coupling portions in which this adiabatic coupling is provided are secured by an optical epoxy or a UV adhesive. Further included are an MTP connector secured to the polymer and an interposer secured to the silicon chip; these are encapsulated. For example, an adhesive filled with silica beads is used. Further included are a heat sink secured to the silicon chip and a cover plate (the outer shell of the package). The whole body is covered by the cover plate. The cover plate functions as the outer shell of the package.

In accordance with a connotational relationship of this package structure, a fabrication assembly method can be provided which includes a sequence of the following steps 1 to 10:

1) A silicon (Si) chip is prepared which has a silicon waveguide (SiWG) array fabricated therein;
2) A polymer is prepared which has a single-mode polymer waveguide (PWG) array fabricated therein;
3) The silicon chip and the polymer are aligned in a manner having a spatial relationship by which optical coupling can be realized;
4) The silicon chip and the polymer are secured to each other by an optical epoxy or a UV adhesive while the state of alignment is maintained;
5) An MTP connector is prepared which is secured to the polymer;
6) An interposer is prepared which is secured to the silicon chip;
7) These are encapsulated (an adhesive filled with silica beads can be used);
8) A heat sink is prepared which is secured to the silicon chip;
9) A cover plate (the outer shell of the package) is prepared; and then
10) The whole body is covered by the cover plate to form a package structure.

FIG. 2 is a top view for explaining overlapping of the silicon waveguide (SiWG) array and the polymer waveguide (PWG) array and for explaining evanescent wave involved in adiabatic coupling. These arrays are, as illustrated in FIG. 2(a), overlapped over a predetermined distance in an optical axis direction, whereby evanescent light is captured and transmitted. In the verification of the predetermined distance in an optical axis direction for the present invention, length L is approximately 3 mm (fabrication error being ±20%). However, those skilled in the art can calculate a theoretically optimum length based on the conditions.

This type of optical coupling is known as an adiabatic coupling.

The width of core of the silicon waveguide (SiWG) array is, as illustrated in FIG. 2(b), smaller than that of the polymer waveguide (PWG) array. In the verification for the present invention, a case is verified in which the width of core of the single-mode polymer waveguide (PWG) array fabricated on the polymer is approximately 5 μm (fabrication error being ±20%) and the width of core of the silicon waveguide (SiWG) array fabricated on the silicon (Si) chip is approximately several hundred nm to 1 μm (fabrication error being ±30%).

Bilateral optical transmission exists between the silicon waveguide (SiWG) array and the polymer waveguide (PWG) array. However, since a scale difference in the width of core exists between the SiWG array and the PWG array, there is a difference in the size of optical loss. Evanescent wave transmitted from the side of SiWG to the side of PWG is easy to capture on the side of PWG. Evanescent wave transmitted from the side of PWG to the side of SiWG is relatively difficult to capture on the side of SiWG. The verification indicates that when the combination of the widths of core above described is used, it is appropriate to set gap g to 3 μm or so (fabrication error being ±20%). However, the appropriate size of gap g is affected by the wavelength of transmitted light and the mode field diameter (MFD). Those skilled in the art can determine the appropriate size of gap g.

Figure 3:
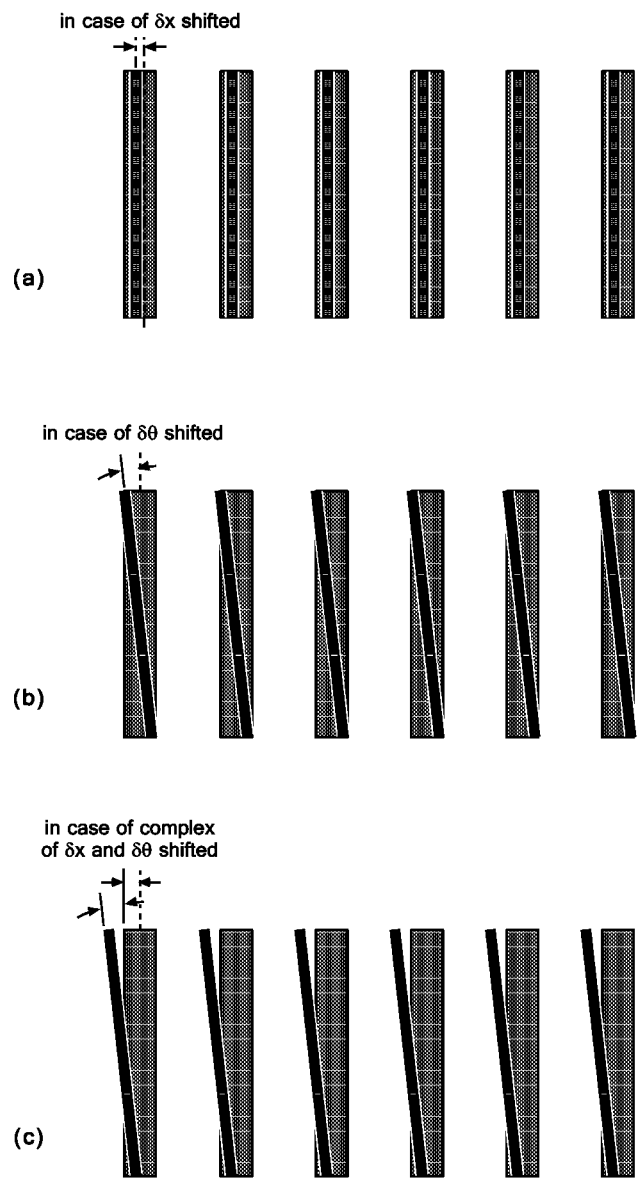
FIG. 3 is a top view for explaining the importance of alignment for overlapping of a silicon waveguide (SiWG) array and a polymer waveguide (PWG) array. More specifically as follows.

FIG. 3 is a top view for explaining the importance of alignment for overlapping of the silicon waveguide (SiWG) array and the polymer waveguide (PWG) array. A slight amount δx of misalignment illustrated in FIG. 3(a) causes a loss of light transmission. A slight amount δθ of misalignment (inclination) illustrated in FIG. 3(b) causes a loss of light transmission. It can be seen that when misalignment of δx and inclination of δθ are, as illustrated in FIG. 3(c), combined, a greater amount of loss arises. From the above description, it is understood that the alignment is very important for overlapping of the silicon waveguide (SiWG) array and the polymer waveguide (PWG) array.

Figure 4:
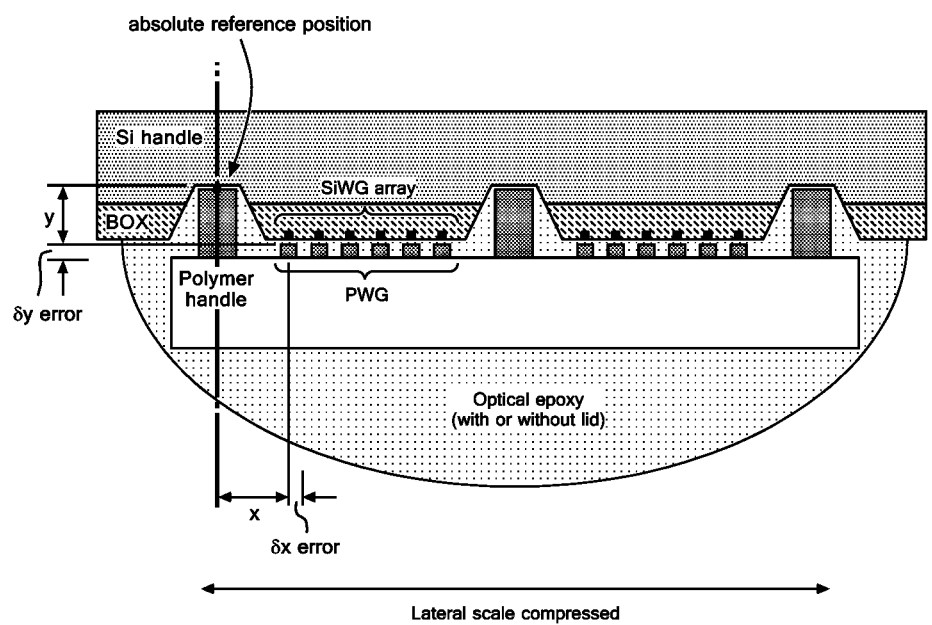
FIG. 4 is an overall view illustrating a combination of a stub fabricated on polymer and a groove fabricated on a silicon chip, the combination allowing alignment of a single-mode polymer waveguide (PWG) array fabricated on polymer and a silicon waveguide (SiWG) array fabricated on a silicon (Si) chip, whereby the adiabatic coupling is realized according to an embodiment of the present invention.

FIG. 4 is an overall view illustrating a combination of a stub fabricated on the polymer and a groove fabricated on the silicon chip, the combination allowing alignment of the single-mode polymer waveguide (PWG) array fabricated on the polymer and the silicon waveguide (SiWG) array fabricated on the silicon (Si) chip whereby the adiabatic coupling is realized according to the present invention.

In the present invention, the single-mode polymer waveguide (PWG) array fabricated on the polymer and the silicon waveguide (SiWG) array fabricated on the silicon (Si) chip are self-aligned according to the groove and the stub highly precisely fabricated on both sides. The gist of the present invention is that the groove and the stub are made to function as the absolute positioning reference to perform the self-alignment according to the groove and the stub.

Figure 5:
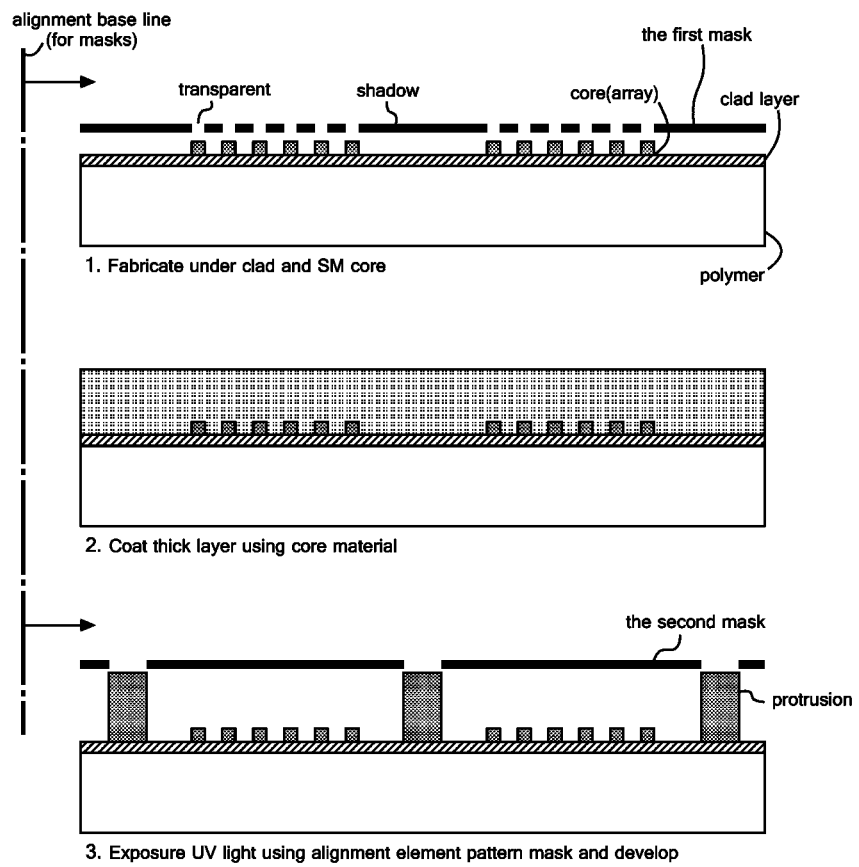
FIG. 5 is a view illustrating the inventive method of highly precisely fabricating on polymer a (single-mode) polymer waveguide (PWG) array and a stub according to an embodiment of the present invention.

FIG. 5 is a view illustrating the inventive method of highly precisely fabricating on the polymer a single-mode polymer waveguide (PWG) array and the stub. The single-mode polymer waveguide (PWG) array and the stub can be highly precisely fabricated in an integrated manner so that the stub and the groove function as the absolute positioning reference. The method includes the following sequence of steps.

(1) Firstly, an under clad layer is coated on the polymer.
(2) A first mask is prepared along the alignment base line above the coated core layer and under clad layer.
(3) Multi-channel cores (or a core array) are fabricated on the clad layer by a photolithography process with a first mask. Here, the refraction index of the core layer material is larger than that of the clad layer material.
(4) Using a same type polymer material as that of the core array, a base layer used to fabricate the stub is coated so that the core array is covered.
(5) A second mask having an exposure pattern different from the first mask is prepared along the same alignment base line used to prepare the first mask.

Here, it can be seen that, since the same alignment base line (for mask) is used, when the distance between the stub used as the absolute positioning reference and the multi-channel cores (the core array or one of the cores in the array) is x (FIG. 4), the positioning error in x-axis δx is minimized so that the assembly is highly precisely performed.

(6) The stub is fabricated by a photolithography process with a second mask.

Both the material of the core used to fabricate the core array by the photolithography process with the first mask and the material of the base layer used to fabricate the stub by the photolithography process with the second mask can be selected from the same type polymer materials, such as acrylic, epoxy, or polyimide. Preferably, developer and rinse liquid used in the photolithography process using the first mask is similar to those used in the photolithography process using the second mask. This is needed to ensure that the core array fabricated by the photolithography process with the first mask maintain their shape in the developing step of the photolithography process with the second mask. When the developer and rinse liquid are used again as it is, the whole process becomes simpler.

Figure 6:
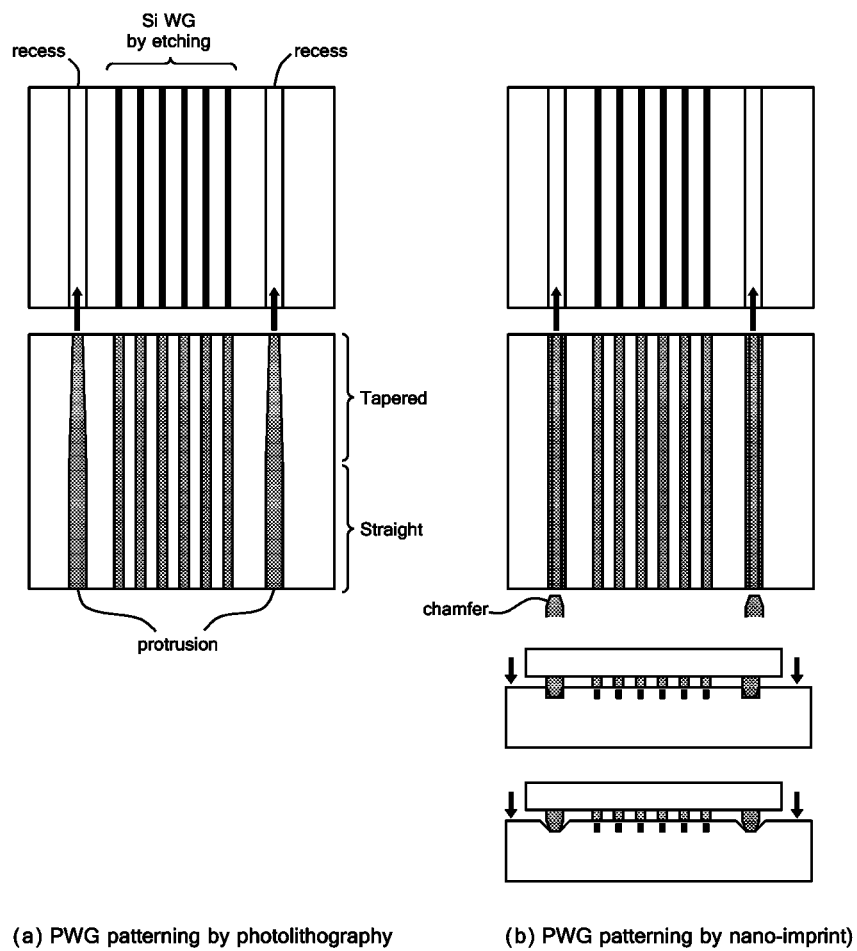
FIG. 6 is a view for explaining respective advantages of PWG patterning by photolithography and PWG patterning by nano-imprint when the polymer waveguide (PWG) array and the stub are fabricated according to an embodiment of the present invention. More specifically as follows.

FIG. 6 is a view for explaining respective advantages of PWG patterning by photolithography and PWG patterning by nano-imprint when the polymer waveguide (PWG) array and the stub are fabricated according to the present invention. In both the PWG patterning by photolithography and the PWG patterning by nano-imprint, a straight portion and a tapered portion can be provided in the stub. The provision of the tapered portion in the stub is advantageous in that, when the stub is inserted in a sliding manner into the groove fabricated on the silicon chip, the insertion is more easily performed.

In the PWG patterning by photolithography, the thickness control of the stub can be precisely performed by a spin coat process. In the PWG patterning by nano-imprint, a metal cast is used which is prepared in advance by a precise cutting process. Accordingly, the thickness control of the stub and the fabrication of a complicated structure of the stub in a height direction can be performed with a sub-micro meter precision. Thus, a chamfer can be provided with high precision. The provision of the chamfer in the stub is advantageous in that, when the stub is placed or thrusted into the groove fabricated on the silicon chip, the placement or insertion is more easily performed.

In this way, when the PWG patterning by photolithography or nano-imprint is used, the insertion can be more easily performed in a sliding or thrusting manner. Furthermore, when the distance between the stub used as the absolute positioning reference and the core array (one of the cores) is x in horizontal direction and y in vertical direction (FIG. 4), the positioning error in x-axis δx and that in y-axis δy are minimized so that the assembly is highly precisely performed.

The groove fabricated on the silicon chip can be highly precisely fabricated by etching or the like along with the silicon waveguide (SiWG) array fabricated on the silicon (Si) chip.

FIG. 7 is a view for explaining respective methods of PWG patterning by photolithography and PWG patterning by nano-imprint when the polymer waveguide (PWG) array and the stub are fabricated according to the present invention.

In the PWG patterning by nano-imprint:
1) Firstly, the base layer of polymer is prepared. Alternatively, a polymer can be coated on a glass substrate;
2) A cast having a groove corresponding to the core of the (single-mode) polymer waveguide (PWG) array and a groove corresponding to the stub thereof is placed on the base layer of polymer. The cast can be of metal. It is known that when the metal cast is used, a high precision is easily achieved;
3) The base layer of polymer is hardened. UV exposure can be performed. The polymer (the base layer) and the glass substrate can be UV-transparent; and
4) The cast is removed from the hardened base layer of polymer.

Figure 8:
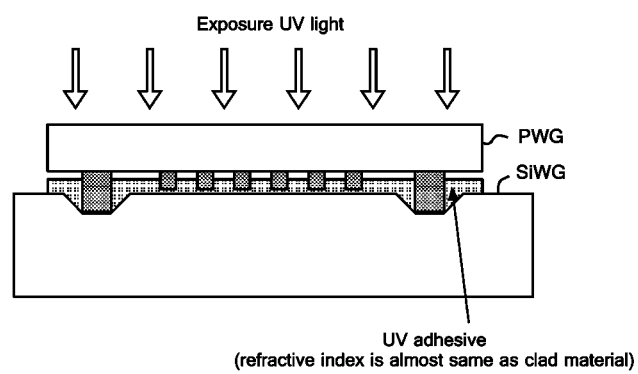
FIG. 8 is a view for explaining a method of aligning the silicon waveguide (SiWG) array and the polymer waveguide (PWG) array and then securing the arrays, and for explaining the state after the arrays have been secured.

FIG. 8 is a view for explaining a method of aligning the silicon waveguide (SiWG) array and the polymer waveguide (PWG) array and then securing the arrays, and for explaining the state after the arrays have been secured.

The package structure including the adiabatic coupling provided according to the present invention can also be provided as a fabrication method according to the connotational relationship described in FIG. 1.

I claim:
1. A method of fabricating on a polymer a single-mode polymer waveguide (PWG) array and a stub so that the single-mode polymer waveguide (PWG) array and the stub are aligned with a silicon waveguide (SiWG) array fabricated on a silicon (Si) chip and a groove fabricated along a direction in which the SiWG is fabricated, whereby an adiabatic coupling is realized, the method comprising the steps of:

coating a clad layer on the polymer;
preparing a first mask along an alignment base line above a core layer and a under clad layer coated;
fabricating a core array on the clad layer according to a photolithography process with the first mask, wherein the refractive index of a material of the core layer being larger than the refractive index of a material of the clad layer;
coating a base layer used to fabricate the stub by use of a same type polymer material as that of the core array, so that the core array is covered by the base layer;
preparing a second mask having an exposure pattern different from the first mask along the same alignment base line used in the preparation of the first mask; and
fabricating the stub according to a photolithography process with the second mask.

2. The method according to claim 1, further comprising the steps of:
preparing the silicon (Si) chip having the silicon waveguide (SiWG) array and the groove fabricated thereon;
preparing the polymer having the single-mode polymer waveguide (PWG) array and the stub fabricated thereon;
aligning the silicon chip with the polymer so that a spatial relationship is provided to realize the adiabatic coupling; and
securing the silicon chip and the polymer by use of an optical epoxy or a UV adhesive.

3. The method according to claim 2, further comprising the steps of:
preparing an MTP connector secured to the polymer;
preparing an interposer secured to the silicon chip; and
encapsulating these.

4. The method according to claim 3, further comprising the steps of:
preparing a heat sink secured to the silicon chip;
preparing a cover plate (the outer shell of a package); and
covering the whole body by the cover plate.

5. The method according to claim 1, wherein the width of core of the single-mode polymer waveguide (PWG) array fabricated on the polymer is approximately 5 μm with fabrication error of ±20% and the width of core of the silicon waveguide (SiWG) array fabricated on the silicon (Si) chip is approximately several hundred nm to 1 μm with fabrication error of ±30%.

6. The method according to claim 1, wherein both the material of the core used to fabricate the core array by the photolithography process with the first mask and the material of the base layer used to fabricate the stub by the photolithography process with the second mask are selected from the same type polymer materials, such as acrylic, epoxy or polyimide, and wherein a developer and a rinse liquid used in the photolithography process with the first mask can be used again as it is as a developer and a rinse liquid used in the photolithography process with the second mask.

7. A combination of a stub fabricated on a polymer and a groove fabricated on a silicon (Si) chip prepared by a method of fabricating on a polymer a single-mode polymer waveguide (PWG) array and a stub so that the single-mode polymer waveguide (PWG) array and the stub are aligned with a silicon waveguide (SiWG) array fabricated on a silicon (Si) chip and a groove fabricated along a direction in which the SiWG is fabricated, whereby an adiabatic coupling is realized, the method comprising the steps of:
coating a clad layer on the polymer;
preparing a first mask along an alignment base line above a core layer and a under clad layer coated;
fabricating a core array on the clad layer according to a photolithography process with the first mask, wherein the refractive index of a material of the core layer being larger than the refractive index of a material of the clad layer;
coating a base layer used to fabricate the stub by use of a same type polymer material as that of the core array, so that the core array is covered by the base layer;
preparing a second mask having an exposure pattern different from the first mask along the same alignment base line used in the preparation of the first mask; and
fabricating the stub according to a photolithography process with the second mask.

8. The method according to claim 7, further comprising the steps of:
preparing the silicon (Si) chip having the silicon waveguide (SiWG) array and the groove fabricated thereon;
preparing the polymer having the single-mode polymer waveguide (PWG) array and the stub fabricated thereon;
aligning the silicon chip with the polymer so that a spatial relationship is provided to realize the adiabatic coupling; and
securing the silicon chip and the polymer by use of an optical epoxy or a UV adhesive.

9. The method according to claim 8, further comprising the steps of:
preparing an MTP connector secured to the polymer;
preparing an interposer secured to the silicon chip; and
encapsulating these.

10. The method according to claim 9, further comprising the steps of:
preparing a heat sink secured to the silicon chip;
preparing a cover plate which is the outer shell of a package; and
covering the whole body by the cover plate.

11. The method according to claim 7, wherein the width of core of the single-mode polymer waveguide (PWG) array fabricated on the polymer is approximately 5 μm with fabrication error of ±20% and the width of core of the silicon waveguide (SiWG) array fabricated on the silicon (Si) chip is approximately several hundred nm to 1 μm with fabrication error of ±30%.

12. The method according to claim 7, wherein both the material of the core used to fabricate the core array by the photolithography process with the first mask and the material of the base layer used to fabricate the stub by the photolithography process with the second mask are selected from the same type polymer materials, such as acrylic, epoxy or polyimide, and wherein a developer and a rinse liquid used in the photolithography process with the first mask can be used again as it is as a developer and a rinse liquid used in the photolithography process with the second mask.

* * * * *